United States Patent [19]

Cronin

[11] 4,202,998
[45] May 13, 1980

[54] AIR ENTRANCE BUSHING FOR GAS-INSULATED BUS

[75] Inventor: John C. Cronin, Greensburg, Pa.

[73] Assignee: Gould Inc., Rolling Meadows, Ill.

[21] Appl. No.: 925,415

[22] Filed: Jul. 17, 1978

[51] Int. Cl.² .................. H01B 17/26; H02G 15/22
[52] U.S. Cl. .................................... 174/31 R; 174/19; 174/142
[58] Field of Search ............ 174/15 BH, 18, 19, 31 R, 174/142, 143

[56] References Cited

U.S. PATENT DOCUMENTS

| 3,849,590 | 11/1974 | Ozawa et al. | 174/31 R |
| 3,934,071 | 1/1976 | Tahiliani | 174/31 R |

FOREIGN PATENT DOCUMENTS

| 1504031 | 10/1967 | France | 174/142 |
| 46-15815 | 4/1971 | Japan | 174/31 R |

Primary Examiner—Laramie E. Askin
Attorney, Agent, or Firm—Ostrolenk, Faber, Gerb & Soffen

[57] ABSTRACT

An internal shield ring for the air entrance bushing of a gas-insulated bus system tapers inwardly at its free end and has a reduced spacing with respect to the central bushing conductor to increase the dielectric stress between the end of the shield ring and the central bus. This reduces the stress on the external bushing insulation material and thus permits a reduction in the bushing diameter.

9 Claims, 6 Drawing Figures

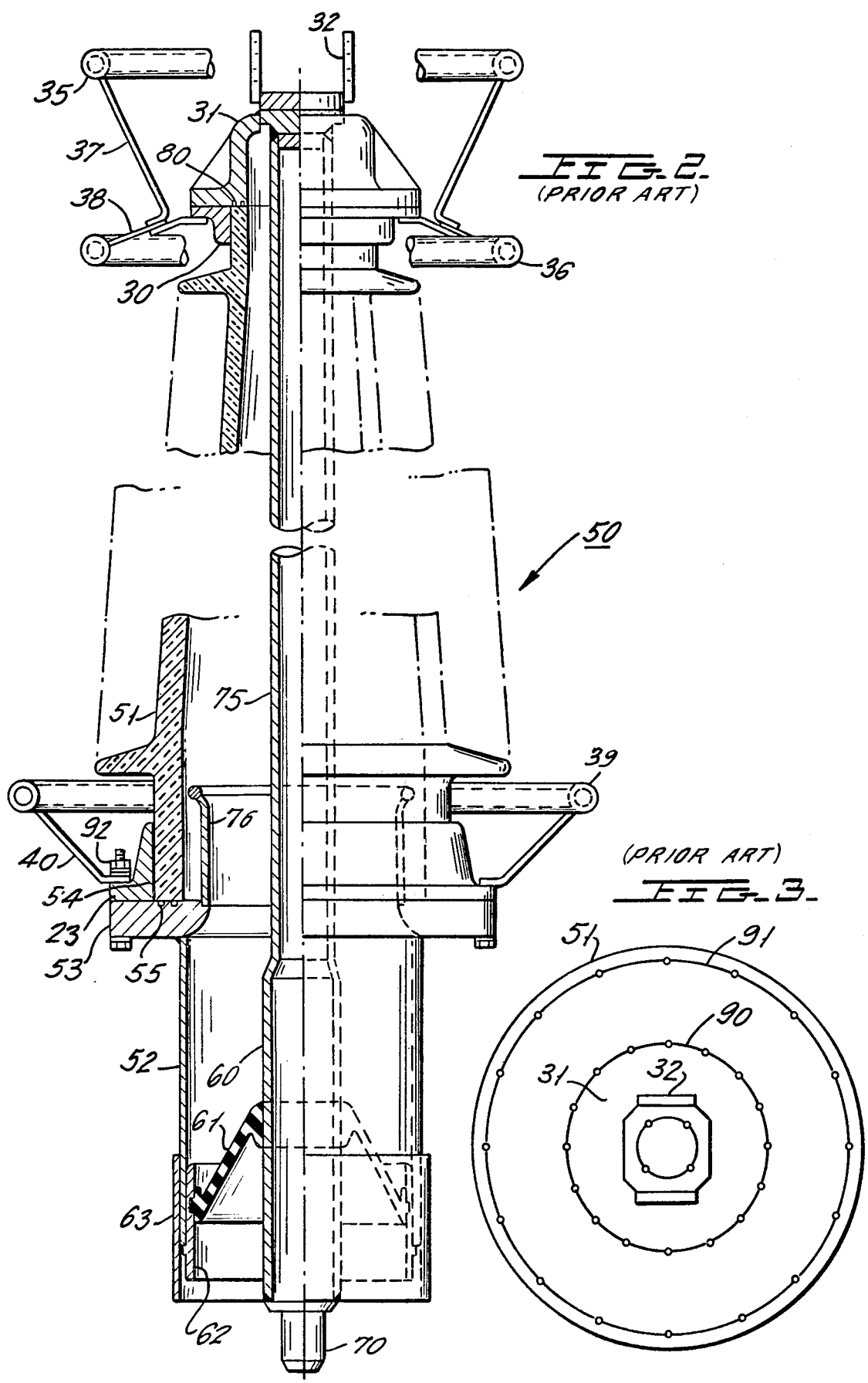

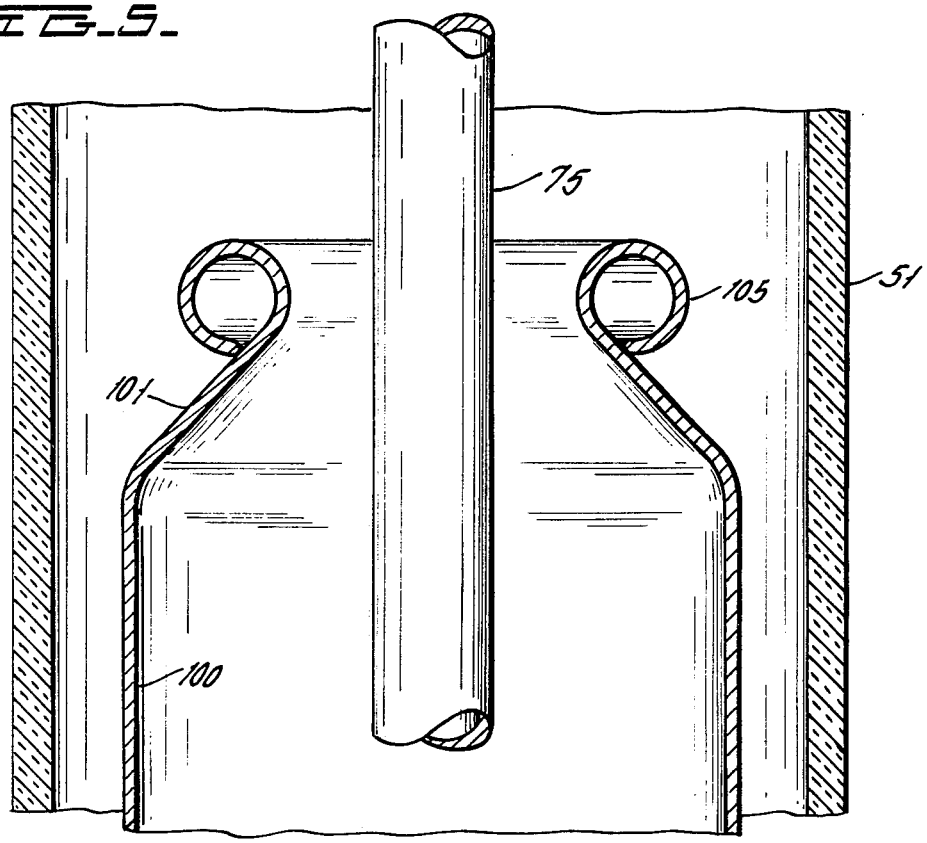
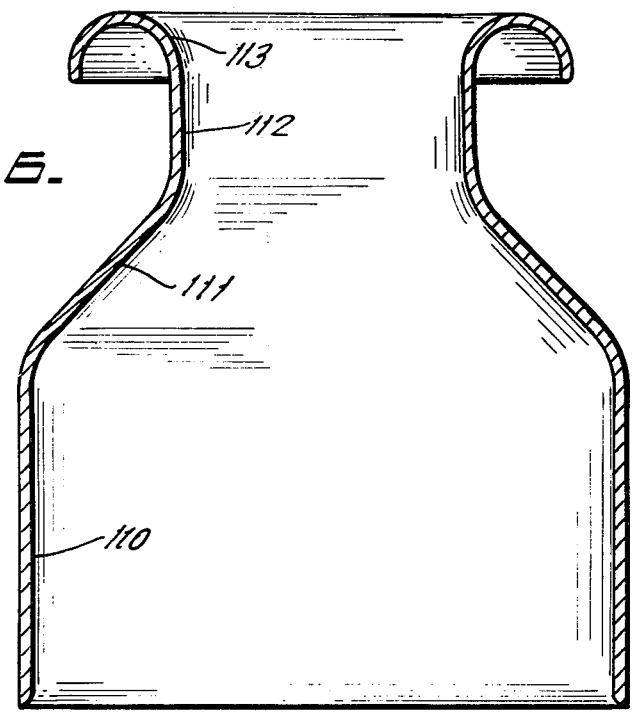

AIR ENTRANCE BUSHING FOR GAS-INSULATED BUS

BACKGROUND OF THE INVENTION

This invention relates to gas-insulated bushings, and more specifically relates to a novel gas-insulated bushing structure having a reduced diameter by virtue of an improved dielectric arrangement for the bus. The invention is specifically an improvement of the air entrance bushing shown in U.S. Pat. No. 3,934,071 in the name of Tahiliani, dated Jan. 20, 1976 and owned by the assignee of the present application.

Gas-insulated bushings as shown in the above patent are relatively simple in construction and consist essentially of a porcelain or other insulation material shell which surrounds a tubular conductor. The space between the conductor and the porcelain is filled with compressed gas, such as sulfur hexafluoride, which is at a gas pressure which is usually about the same as that used in the gas-insulated equipment which is connected to the bushing.

Capacitive grading is generally not used for this type of bushing and this results in a tendency for high dielectric stress to develop at the ground side of the bushing.

The bushing is more capable of supporting dielectric stress on its interior than on its exterior, since the interior of the bushing is filled with electronegative gas under pressure. Therefore, the dielectric stress appearing on the external surface of the bushing, whether it be porcelain or any suitable insulation plastic, tends to be the limiting factor in the performance of the bushing and the bushing is generally constructed in a manner to reduce the external surface stresses.

External surface stress has been limited to acceptable limits by using relatively large diameter insulation bodies. This is a satisfactory solution to the problem at lower voltages, where the insulator costs are relatively low, but at higher voltages the very large diameter porcelain or other insulation material becomes very expensive and difficult to manufacture. The porcelain diameter can be reduced by arrangements such as that disclosed in above-noted U.S. Pat. No. 3,934,071. However, the arrangement of the above-noted patent still requires a relatively large diameter insulation housing because of the relatively high external stress on the outer surface of the insulation body.

BRIEF DESCRIPTION OF THE INVENTION

The principle of the present invention is to substantially increase the dielectric stress within the interior of the porcelain or other insulation shell and in the region where there is only clean high pressure gas between a grounded shield ring and the central bushing conductor which is at high voltage relative to the grounded shield. By increasing the stress in this location, the stress on the exterior of the bushing is limited, thereby permitting the use of smaller diameter insulation bodies for a given voltage capability.

In accordance with the present invention, a novel shield arrangement is provided within the porcelain bushing which consists of an inwardly tapered conical shield structure which has a reduced diameter end which surrounds and is spaced from the central bushing conductor and produces relatively high dielectric stress in the gas gap between the shield end and the conductor, thereby to reduce the dielectric stress on the exterior of the bushing.

More specifically, and in accordance with the invention, it is recognized that the internal dielectric stress in existing gas-insulated bushings does not take advantage of the intrinsic capability of the internal insulation system which consists of only clean gas, unobstructed by surfaces or the like and which present a pure gas gap between the conductive parts. By arranging the shield in the interior of the bushing in such a way that these stresses are intentionally raised as close as possible to the maximum capability of the gas, it becomes possible to reduce the stress on the external surface of the porcelain or other insulation body. This, in turn, allows the porcelain diameter to be reduced significantly to cause a significant cost reduction.

BRIEF DESCRIPTION OF THE DRAWINGS

FIG. 2 shows a cross-sectional view similar to that of FIG. 1 for a modified bus construction which takes the form shown in U.S. Pat. No. 3,934,071.

FIG. 3 is a top view of the bushing of FIG. 2 with the outer corona ring removed for purposes of clarity.

FIG. 5 is a cross-sectional view which illustrates a modification of the stress shield of FIG. 4.

FIG. 6 illustrates a preferred configuration for the stress shield of the invention.

DETAILED DESCRIPTION OF THE DRAWINGS

Figure 1:
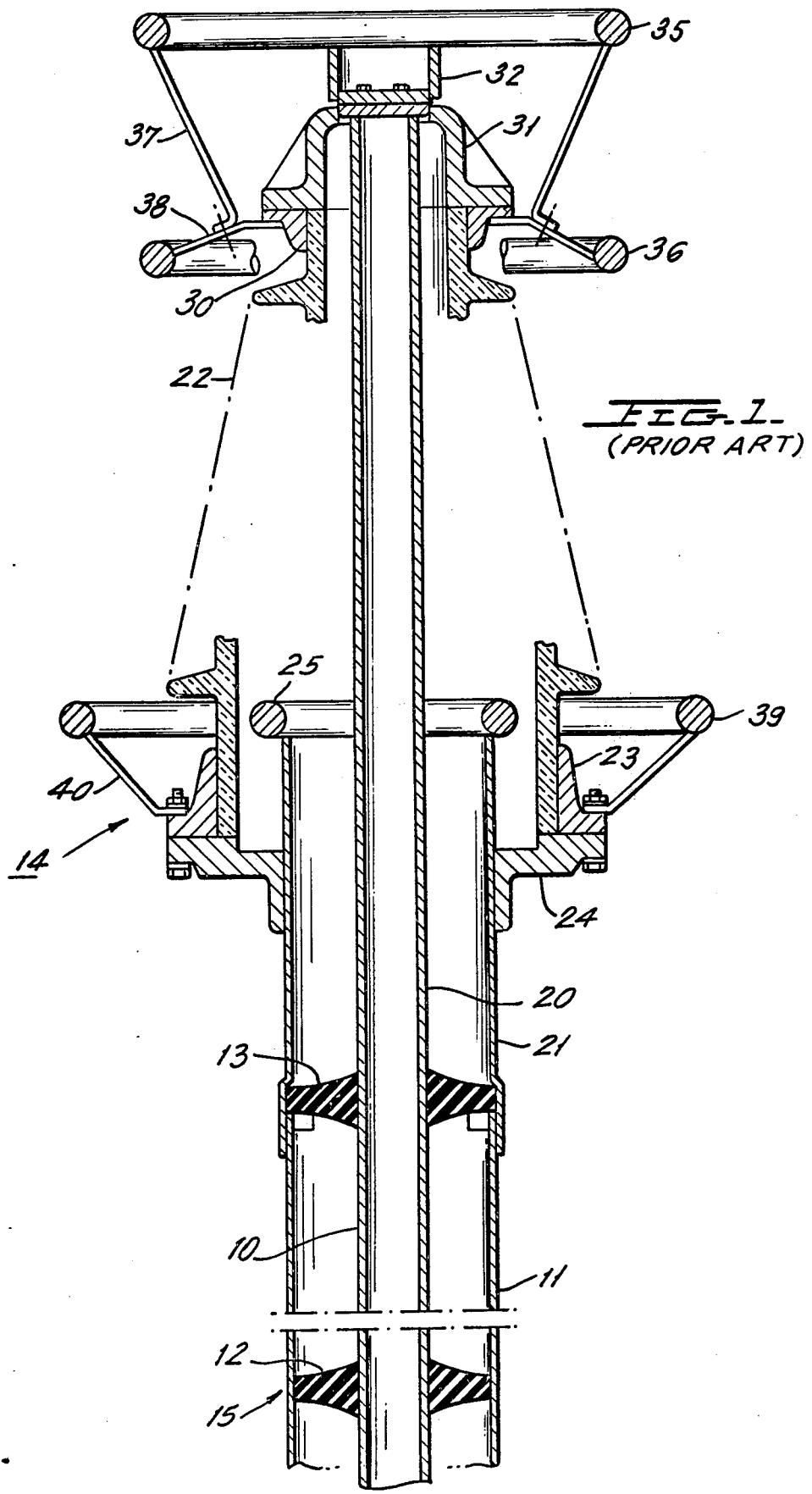
FIG. 1 shows a prior art bushing arrangement in which a gas-insulated bus is terminated by an air entrance bushing for the bus.

FIGS. 1, 2 and 3 will be first described where these Figures and their description are substantially identical to the figures and description of U.S. Pat. No. 3,934,071.

Referring first to FIG. 1, there is illustrated therein one end of a conventional gas-insulated bus 15 comprised of a central tubular conductor 10 which might have an outer diameter, for example, of five inches and which is supported within an outer grounded metallic housing 11 which could have a diameter, for example, of twelve inches. The central conductor 10 is supported within the outer housing 11 by a plurality of axially spaced support insulators, such as insulator disk 12 and the insulator disk 13 which terminate the air entrance bushing 14. The air entrance bushing 14 will have any desired configuration but typically will be vertically mounted to enable connection to overhead lines which are to be connected to the gas-insulated bus system 15. The interior of the gas-insulated bus 15 may be filled with gas, such as sulfur hexafluoride which could be at a pressure, for example, of 45 p.s.i.g.

The bushing 14 consists of the bushing conductor 20 which may be identical to conductor 10 of the gas-insulated bus 15, a cylindrical conductive grounded housing 21, which may be identical to housing 11, and a skirted elongated porcelain tubular jacket or shell 22, with its associated top and bottom hardware. The porcelain shell 22 is cemented to a metallic ring 23 which is bolted or otherwise secured to flange 24 which is, in turn, welded or otherwise secured to cylindrical housing 21. The housing 21 penetrates into the large diameter end of porcelain jacket 22 and is terminated by a corona ring 25. Thus, in the prior art arrangement, the porcelain shell 22 had to have a large bottom diameter which was greater than the diameter of housing 21 so that the end of housing 21 could be received into porcelain shell 22 in the manner shown.

The upper hardware of the bushing 14 consists of a metallic ring 30 which is cemented to the upper end of porcelain shell 22 and an upper metallic cap 31 which is bolted or otherwise secured to the ring 30 and to the upper end of conductor 20. The upper cap 31 then has a terminal connector 32 bolted thereto for receiving the ends of the overhead lines which are to be connected to the bushing 14. Suitable corona rings 35 and 36 are connected to the cap 31 and thus to the upper end of central conductor 20 as by wire connectors 37 and 38. A bottom corona ring 39 is connected to conductive ring 23 and thus to ground as by support wires 40.

In the prior art construction described above, the bushing 14 is connected to the gas-insulated bus system 15 as by causing the end of cylindrical housing 21 to telescope over cylindrical housing 11 with a good seal being made at this point. This is a conventional method and construction for joining together bus sections similar to sections 15 when the gas-insulated system is installed in the field. Clearly, any other method of connection could be used. However, the diameter of housing 21 is fixed, thereby fixing the minimum diameter or the lower end of porcelain shell 22. Since the porcelain shell 22 must have a large diameter lower end, the cost of the bushing end becomes relatively high and, moreover, if increased gas pressure is to be used within the bushing 14, to compensate for the presence of contamination particles, the wall thickness of the porcelain 22 must be substantially increased.

Another prior art housing is shown in FIGS. 2 and 3 for the bushing 50. Referring now to FIGS. 2 and 3, the bushing 50 consists of a skirted porcelain jacket 51 which, for the same rating bushing as that of FIG. 1, will have a bottom diameter portion which is substantially equal to the outer diameter of the grounded housing to which the bushing is to be connected. Thus, in FIG. 2 a cylindrical grounded housing member 52, which corresponds to grounded housing section 21 of FIG. 1, is connected to a lower conductive flange 53 as by brazing or the like, and the flange 53 is in turn bolted or otherwise secured to ring 23 which is cemented by the cement layer 54 to the bottom of the porcelain 51. Note that suitable sealing rings, such as sealing rings 55, are provided between the bottom of porcelain 51 and flange 53 to prevent the leakage of high-pressure gas from within the interior of porcelain 51 to the external atmosphere.

It is important to note that, in the configuration of FIG. 2, the lower diameter of porcelain member 51 is substantially equal to the outer diameter of the grounded housing 52. Thus, the cost of the bushing will now be substantially reduced since it is proportional to the square of this largest diameter portion of the bushing porcelain.

By way of example, for a given application, the large diameter of bushing 14 of FIG. 1 will be about 22 inches, while the bushing of the invention will have a diameter of 17 inches, while retaining the same electrical performance. This reduction in diameter can reduce the bushing cost by about 40%.

FIG. 2 shows a modified arrangement for the support of the central conductor 60 of the bushing (corresponding to conductor 20 in FIG. 1) wherein the conductor 60 receives a conical insulator 61 which extends between the lower portion of conductor 60 to a ring 62 which is secured to housing 52 and is backed by a backing ring 63.

This configuration is the same configuration which is used in U.S. Pat. No. 3,813,475 and is extremely useful in terminating the bottom of the bushing 50 and to enable the connection of the bushing to the standard type of gas-insulated housing such as the bus 15 of FIG. 1. The central conductor 60 is then provided with a reduced contact diameter region 70 to enable the plug-in connection of the bus to the central conductor of the bus which is being terminated in a manner shown, for example, in U.S. Pat. No. 3,902,001 dated Aug. 26, 1975 in the name of James C. Cron, entitled FLOATING CORONA SHIELD, and assigned to the assignee of the present invention.

In FIG. 2, the bus conductor 60 has a reduced diameter region 75 which begins just below the level of flange 53 in order to increase the spacing between the surface of the central conductor and the interior surface of the porcelain shell 51.

The outer end of the bushing 50 is then terminated in a manner substantially identical to that described in connection with FIG. 1 where corresponding components in the upper termination of FIGS. 2 and 3 have been given similar identifying numerals. Note that, in the upper hardware construction, seals 80 are disposed between conductive ring 31 and the upper end of the porcelain jacket 51 to again seal the volume between conductor 60 and the porcelain housing 51.

FIG. 3 illustrates the general configuration of the bushing as seen from the top and shows the U-shaped arrangement for the upper terminal 32 and the locations of a first bolt ring 90 for the bolts which can connect conductive ring 31 to the conductive ring or flange 30 and also shows the bolt ring 91 of the bolts including bolt 92 for connecting ring 23 to the conductive flange 53.

Figure 4:
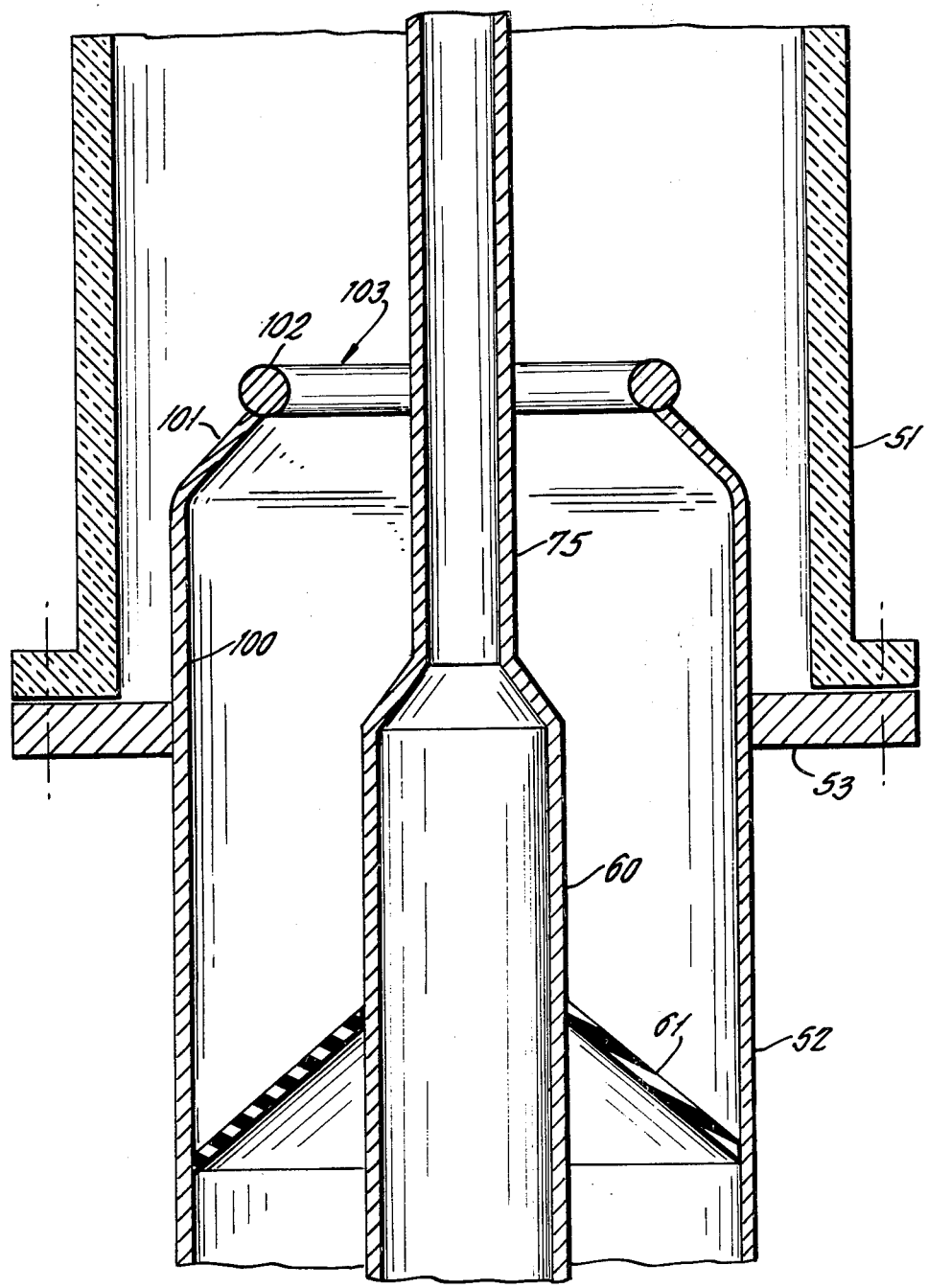
FIG. 4 is a schematic illustration of a bushing arrangement incorporating the present invention.

The principle of the present invention is best illustrated in FIG. 4, where the mounted components of FIGS. 2 and 3 are schematically reproduced. Thus, in FIG. 4, the bushing arrangement schematically illustrated contains the insulation jacket 51 which could be of any desired insulation material, the support flange 53 which is sealed to insulator 51, the central high voltage conductor 60 and its reduced diameter section 75 and the conical insulator 61 for supporting conductor 60 within enclosure 52.

In accordance with the present invention, the grounded enclosure 52 may continue through the flange 53 (or may be inwardly stepped as in FIG. 2) and is then connected to the internal cylindrical corona shield section 100 which is constructed of an inwardly tapered conical configuration in accordance with the present invention. Thus, in FIG. 4 the shield 100, which replaces the shield 76 of FIG. 2, has an inwardly conical tapering section 101 which terminates with a corona ring 102 which is very closely located and symmetrically surrounds the central conductor 75 and is spaced therefrom by the annular throat region 103.

The dielectric stress within throat region or gap 103 is substantially increased beyond that of the arrangements of FIG. 1 or 2, whereby the external stress on the bushing shell 51 will be reduced. Tests have revealed that, by increasing the stress in throat 103 toward the maximum capability of the gas, stress reductions in excess of 20% can be achieved on the exterior surface of the insulator shell 51. Thus, the insulator shell 51 can have a reduced diameter and, therefore, the cost of the bushing can be substantially reduced.

The spacing between ring 102 and central conductor 75 can be reduced to the point where the sulfur hexafluoride gas within shell 51 can be stressed to its full capability which is from 450 kilovolts per inch to 650 kilovolts per inch (at 45 p.s.i.g.). By way of example, when the diameter of central conductor 75 is about 4½ inches and the maximum outer diameter of shield 100 is 24 inches, the throat of shield 100 can be tapered down to less than 16 inches in diameter.

In principle, the diameter of the corona ring 102 is reduced to the point where the gas is stressed to its maximum safe capability. If desired, the interior surface of the ring 102 and the confronting surface of conductor 75 and a portion of the interior end of the conical region 101 can be polished or coated with insulation material to improve their ability to resist corona discharge.

In FIG. 4, the ring 102 is shown as a solid ring which might be of aluminum or the like. FIG. 5 illustrates a modification for the termination of the shield 100 wherein the conductive shield 100 has its small diameter end rolled outwardly to the form shown by outwardly rolled section 105.

In FIGS. 4 and 5, the shield 100 can be of any desired material, such as aluminum, having a thickness which might be, for example, ⅛ inch.

FIG. 6 shows a specific shield structure for the termination of an outer gas bus housing having a diameter of 24.125 inches and rated at about 750 kV. Thus, the shield structure of FIG. 6 has a cylindrical section 110 which is about 5⅜ inches in length, which section bends inwardly into the conically inward direction section 111 which has an axial length of about 4⅝ inches. Section 110 joins section 111 over a radius of about 2 inches. The upper end of section 111 is curved on a radius of about 1⅞ inches into a cylindrical section 112 which has an axial length of about 1⅞ inches. This section 112 then terminates on a last spiral rolled section 113 which has a 1 inch radius.

The shield of FIG. 6 can be used with reduced dimensions in the bushing of FIGS. 1 to 4 in order to carry out the present invention, wherein the stress between the small diameter end of the shield and the central high voltage conductor is increased to close to the dielectric capability of the insulation gas within the bushing. Thus, the stress on the exterior of the bushing is reduced to enable the use of smaller diameter bushings for a given voltage capability.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A gas-insulated bushing comprising, in combination:

an axially elongated hollow insulation shell filled with gas under pressure;

a conductive mounting flange fixed to one end portion of said insulation shell;

an elongated high voltage conductor extending along the axis of said insulation shell and terminating at the end of said insulation shell opposite said one end portion and being connectable to regions external of said insulation shell;

a gas-filled grounded cylindrical enclosure disposed coaxially with said insulation shell and connected to said flange; said elongated conductor having a portion thereof extending beyond said flange and into said cylindrical enclosure and along the axis of said cylindrical enclosure;

insulation support means fixed within said cylindrical enclosure supporting said elongated conductor with respect to said enclosure and with respect to said insulation shell;

and a hollow conductive shield having one end connected to said flange and to said cylindrical enclosure and being coaxial with said insulation shell and with the axis of said elongated conductor and extending from said one end of said insulation shell and into the interior of said insulation shell; the opposite end of said conductive shield having a diameter substantially smaller than either that of said one end of said shield or that of said insulation shell, the space between said opposite end of said conductive shield and said elongated conductor being filled solely with said gas, whereby the dielectric stress in said gas within said insulation shell in the annular region between said opposite end of said shield and said central conductor when said bushing is in operation is greater than the stress at any other region within said bushing.

2. The bushing of claim 1 wherein said stress in said annular region is close to the maximum dielectric capability of said gas.

3. The bushing of claim 1 wherein said gas is SF$_6$ at a pressure of about 45 p.s.i.g. and wherein said dielectric stress is between about 450 and about 650 kV per inch.

4. The bushing of claim 1 wherein said shield has an inwardly tapering conical section disposed between its said one end and its said opposite end.

5. The bushing of claim 1 wherein said shield has a solid smooth ring fixed to its said opposite end.

6. The bushing of claim 1 wherein said shield has the opposite end thereof rolled over to define a smooth, ring-shaped termination.

7. The bushing of claim 1 wherein the radial gap between said cylindrical enclosure and said central conductor is greater than the gap between said flange and said central conductor.

8. The bushing of claim 1 wherein said insulation shell is made of porcelain.

9. The bushing of claim 1 wherein said insulation shell is generally vertically disposed.

* * * * *